(12) United States Patent
Mohammed et al.

(10) Patent No.: US 10,207,252 B2
(45) Date of Patent: Feb. 19, 2019

(54) PRISTINE AND SURFACE FUNCTIONALIZED CELLULOSE NANOCRYSTALS (CNCS) INCORPORATED HYDROGEL BEADS AND USES THEREOF

(71) Applicants: Nishil Mohammed, Waterloo (CA); Nathan Grishkewich, Beamsville (CA); Kam Chiu Tam, Waterloo (CA); Richard Berry, Notre-Dame-de-l'Ile Perrot (CA)

(72) Inventors: Nishil Mohammed, Waterloo (CA); Nathan Grishkewich, Beamsville (CA); Kam Chiu Tam, Waterloo (CA); Richard Berry, Notre-Dame-de-l'Ile Perrot (CA)

(*) Notice: Subject to any disclaimer, the term of this patent is extended or adjusted under 35 U.S.C. 154(b) by 70 days.

(21) Appl. No.: 14/976,564

(22) Filed: Dec. 21, 2015

(65) Prior Publication Data

US 2016/0175812 A1 Jun. 23, 2016

Related U.S. Application Data

(60) Provisional application No. 62/095,366, filed on Dec. 22, 2014.

(51) Int. Cl.
*B01J 20/24* (2006.01)
*B01J 20/26* (2006.01)
*B01J 20/30* (2006.01)
*B01J 20/28* (2006.01)
*C02F 1/28* (2006.01)
*C02F 101/30* (2006.01)

(52) U.S. Cl.
CPC ............. *B01J 20/262* (2013.01); *B01J 20/24* (2013.01); *B01J 20/261* (2013.01); *B01J 20/28047* (2013.01); *B01J 20/3085* (2013.01); *C02F 1/285* (2013.01); *C02F 1/286* (2013.01); *C02F 1/288* (2013.01); *C02F 2101/308* (2013.01); *C02F 2305/08* (2013.01)

(58) Field of Classification Search
None
See application file for complete search history.

(56) References Cited

U.S. PATENT DOCUMENTS

| 2014/0120169 A1* | 5/2014 | Lee | ........ A61K 9/1647 424/499 |
| 2014/0142250 A1* | 5/2014 | Lee | ........ C08G 83/008 525/123 |
| 2015/0072902 A1* | 3/2015 | Lafitte | ........ C09K 8/035 507/112 |
| 2015/0366900 A1* | 12/2015 | Li | ........ A61L 27/26 424/78.32 |

(Continued)

OTHER PUBLICATIONS

Unpublished U.S. Appl. No. 62/054,522 to Appel incorporated by reference in 20170319506 (Nov. 2017) (Year: 2017).*

(Continued)

*Primary Examiner* — Chester T Barry
(74) *Attorney, Agent, or Firm* — Taft Stettinius & Hollister LLP

(57) ABSTRACT

The present disclosure relates to the use of pristine and surface functionalized cellulose nanocrystal (CNC) incorporated hydrogel beads as adsorbent materials for water treatment applications. Here the hydrogel beads were prepared by ionic crosslinking of biopolymer sodium alginate using calcium chloride.

15 Claims, 10 Drawing Sheets

(56) References Cited

U.S. PATENT DOCUMENTS

| | | | |
|---|---|---|---|
| 2016/0113881 A1* | 4/2016 | Sosin | A61K 39/35 424/497 |
| 2016/0347916 A1* | 12/2016 | Wu | C08J 3/126 |
| 2017/0239600 A1* | 8/2017 | Chen | B01D 39/02 |
| 2017/0319506 A1* | 11/2017 | Appel | A61K 9/5161 |

OTHER PUBLICATIONS

Annadurai, G. et al., Journal of Hazardous Materials. 92(3), 2002. pp. 263-274.

Araki, J. et al., Steric Stabilization of a Cellulose Microcrystal Suspension by Poly(ethylene glycol) Grafting, Langmuir, (17), 2001, pp. 21-27.

Batmaz, R., et al., Cellulose. (21), 2014, pp. 1655-1665.

Doğan, M. et al., Water, Air, and Soil Pollution. 192(1-4), 2008, pp. 141-153.

Dong, S. et al., Journal of the American Chemical Society. 129(45), 2007, pp. 13810-13811.

Filpponen, I. et al., Biomacromolecules. 11(4), 2010. pp. 1060-1066.

Filpponen, I. et al., Nanomaterials and Nanotechnology, 1(1), 2011. pp. 34-43.

Ghosh, D. et al., Applied Clay Science. 20(6), 2002, pp. 295-300.

Habibi, Y. et al., TEMPO-mediated surface oxidation of cellulose whiskers, Cellulose. (13), 2006, pp. 679-687.

Hameed, B.H. et al., Dyes and Pigments. 75(1), 2007, pp. 143-149.

Hemraz, U. D. et al., Canadian Journal of Chemistry. 91(10), 2013, pp. 974-981.

Kannan, N. et al., Dyes and pigments, 51(1), 2001, pp. 25-40.

Lee, M. et al., ChemPlusChem. 77(11), 2012, pp. 987-990.

Perez, D.d.S. et al., Biomacromolecules. 4, 2003, pp. 1417-1425.

Saito, T. and Isogai, A., TEMPO-Mediated Oxidation of Native Cellulose. The Effect of Oxidation Conditions on Chemical and Crystal Structures of the Water-Insoluble Fractions, Biomacromolecules. 5, 2004, pp. 1983-1989.

Vadivelan, V. et al., Journal of Colloid and Interface Science. 286(1), 2005, pp. 90-100.

Wang, S. et al., Fuel. 87(15), 2008. pp. 3469-3473.

* cited by examiner

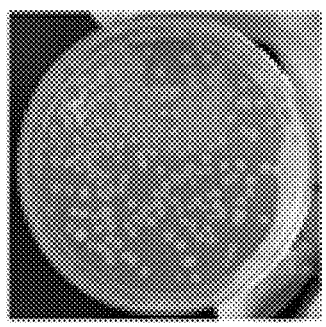
FIG. 9A Control
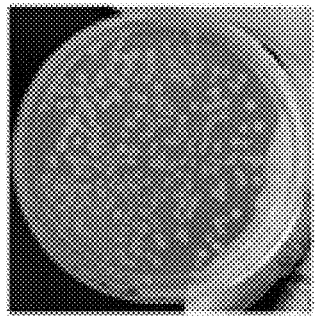
FIG. 9B 1 mg/ml
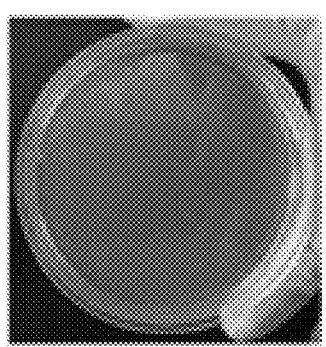
FIG. 9C 2 mg/ml
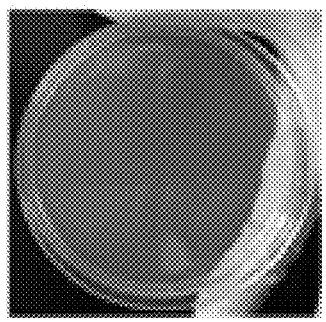
FIG. 9D 3 mg/ml
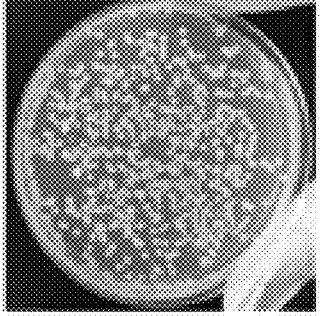
FIG. 9E Control
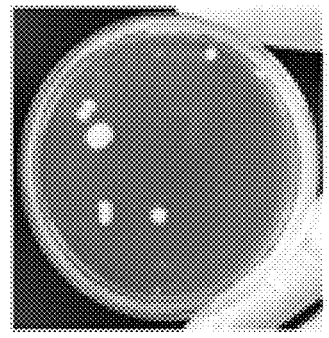
FIG. 9F 1 mg/ml
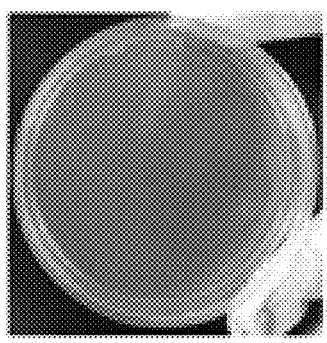
FIG. 9G 2 mg/ml
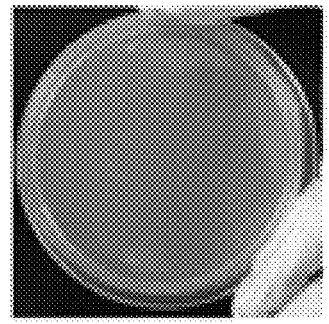
FIG. 9H 3 mg/ml 
PRISTINE AND SURFACE FUNCTIONALIZED CELLULOSE NANOCRYSTALS (CNCS) INCORPORATED HYDROGEL BEADS AND USES THEREOF

CROSS-REFERENCE TO RELATED APPLICATION

This application claims the benefit of U.S. provisional application Ser. No. 62/095,366 filed Dec. 22, 2014, the disclosure of which is hereby incorporated in its entirety by this reference.

FIELD OF THE DISCLOSURE

The present disclosure relates to the use of pristine and surface functionalized cellulose nanocrystal (CNC) incorporated hydrogel beads, as adsorbent materials for the adsorption of contaminants, such as in water treatment applications.

BACKGROUND OF THE DISCLOSURE

Adsorbents based on sustainable nanomaterials from nature have attracted significant attention and are the subject of research.

Cellulose is the most abundant renewable material found in nature which contains amorphous and crystalline domains. Cellulose nanocrystals (CNCs) are obtained by an acid hydrolysis of native cellulose using an aqueous inorganic acid like sulphuric acid. After complete (or near complete) acid hydrolysis of the amorphous sections of native cellulose, individual rod like crystallites called CNCs that are insensitive to acidic environment are obtained. This rod like structures have diameters in the range of 10-20 nm and lengths of a few hundred nanometers Acid hydrolysis of native cellulose using sulphuric acid leads to the formation of sulfate ester groups that introduce negative charges to the surface of CNCs. These negative charges on the surface of CNCs promote uniform dispersion of nanocrystals due to electrostatic repulsion in aqueous solutions.

SUMMARY OF THE DISCLOSURE

In one aspect, there is provided a process for removing contaminants from water and/or an aqueous composition containing at least one contaminant, said process comprising: contacting hydrogel beads as defined herein with said water or aqueous composition containing at least one contaminant, wherein said process is removing at least part of at least one contaminant present in said water or aqueous composition.

In one aspect, there is provided hydrogel beads incorporating cellulose nanocrystals (CNC), wherein said CNCs are incorporated partially or wholly within said beads, said beads comprising a matrix of cross-linked natural or synthetic polymer and said CNC being pristine or functionalized CNCs.

In a further aspect, there is provided a method of preparing hydrogel beads incorporating CNC, said method comprising: i) providing an aqueous mixture of a cross-linkable natural or synthetic polymer and pristine or functionalized CNCs; and ii) contacting the mixture of step i) with a cross-linker suitable to cause the formation of hydrogel beads by cross-linking of adjacent chains of said cross-linkable natural or synthetic polymer.

In a further aspect, there is provided a method for incorporating CNCs in hydrogel beads, comprising: providing a first aqueous mixture of a cross-linkable natural or synthetic polymer and pristine or functionalized CNCs; providing a second aqueous mixture comprising a cross-linker for cross-linking adjacent chains of said cross-linkable natural or synthetic polymer; contacting said first and second aqueous mixtures; and allowing the mixtures to react and form hydrogel beads incorporating CNCs.

DESCRIPTION OF THE DRAWINGS

The present disclosure is illustrated with reference to the following drawings:

FIGS. 9A to 9H are the illustrations of antibacterial activity (A) *Escherichia coli* (B) *Bacillus subtilis* with varying adsorbent dosages.

DETAILED DESCRIPTION OF THE DISCLOSURE

Figure 1:
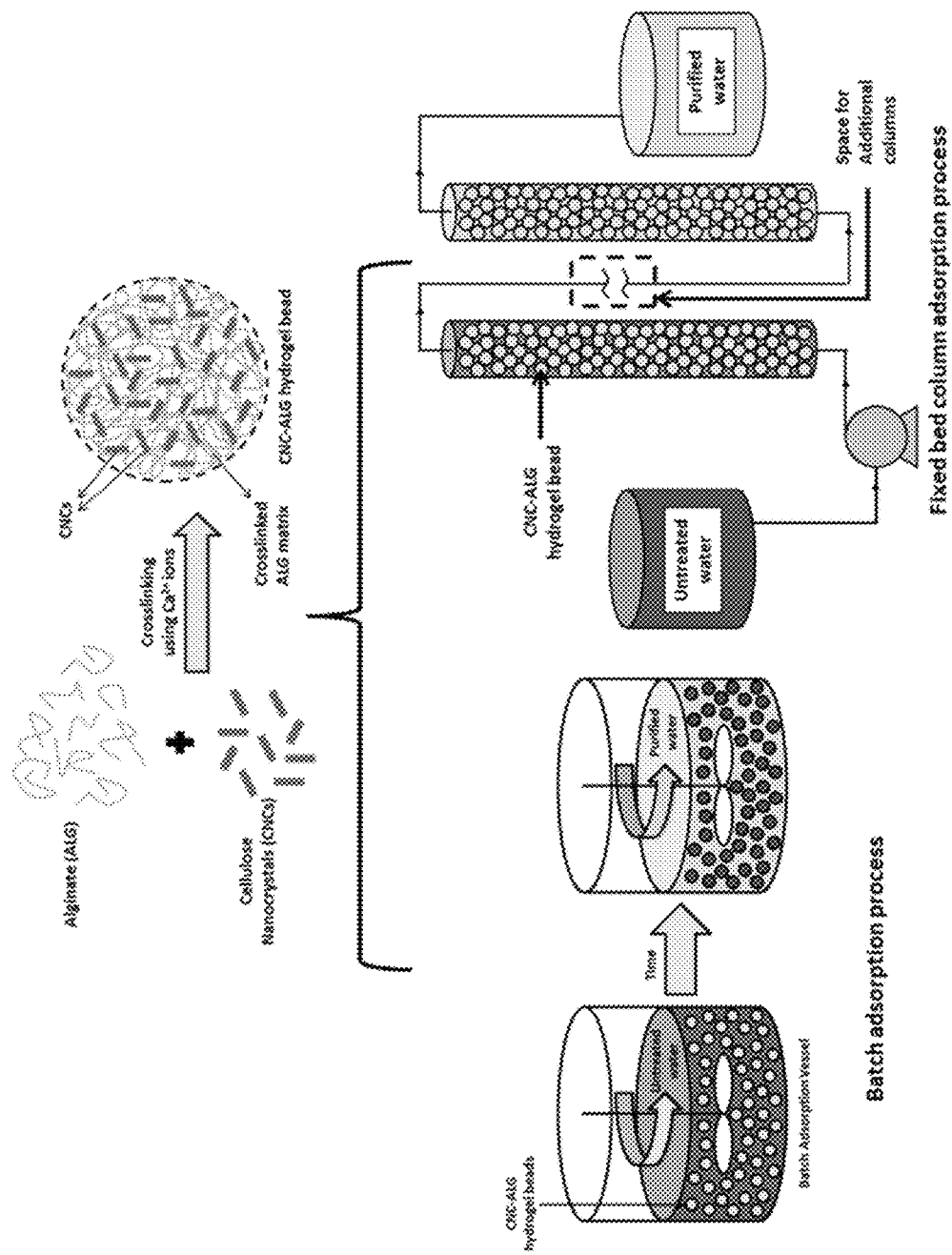
FIG. 1 is a schematic representation of the preparation of CNC incorporated hydrogel beads and their use in batch as well as continuous adsorption process for water treatment applications.

This disclosure provides hydrogel beads encapsulating CNC (including pristine and functionalizing CNCs) for adsorbing contaminants, such as cationic dyes, in water/aqueous mixtures.

CNCs provides the property of removing certain contaminants, in water/aqueous mixtures, However separation of these CNCs from water after removing the contaminants is an energy intensive and time consuming process that involves coagulation and high speed centrifugation. It has been observed that the CNC-encapsulated hydrogel beads as described herein could offer the opportunity of a more straightforward and less labor/energy intensive separation from water/aqueous compositions after adsorbing contaminants.

It is believed that the adsorption properties of the hydrogel bead matrix can also combine with the adsorption properties of the CNCs, because of their inherent ionic charges and porous nature. Incorporating CNCs within hydrogel beads can also help to enhance the mechanical properties of CNCs.

In one embodiment, the hydrogel beads have a size (in diameter) of about 500 um to about 1 cm, alternatively from about 1 mm to about 5 mm (including from about 1.9 mm to 3.4 mm).

In one embodiment, the beads can be made using a cross-linkable natural or synthetic polymer. Examples of such matrix material include alginate, chitosan, starch, polylacrylic acid and polystyrene. Especially preferred is an alginate matrix.

Alginate is a natural polysaccharide obtained from the cell walls of brown seaweeds and sodium salt of this polysaccharide is produced by industries in large scale as sodium alginate. It is an anionic polysaccharide composed of (1-4) linked β-D-mannuronate (M) and α-L-guluronate (G) units linked by β-1,4 and α-1,4 glycosidic bonds. In the presence of cations, such as $Ca^{2+}$, they will form hydrogels due to ionic crosslinking via calcium bridges between M and G units on the adjacent chains. Alginate is also biocompatible, biodegradable, readily available, inexpensive and non-toxic. Due to the presence of carboxylate functional groups along the polymeric chain, it is believed that alginate also contributes to the adsorption properties of the invention disclosed herein.

Alginate hydrogel beads can be prepared by ionic crosslinking of an alginate salt (e.g. sodium alginate) using di/trivalent cations (e.g. $Ba^{2+}$, $Ca^{2+}$ and $Fe^{3+}$). When calcium is used, calcium chloride solution is possible source of calcium ion, however a solution of another calcium salt, such as calcium nitrate, may be used. Preferably, the alginate salt is sodium alginate and the cation is $Ca^{2+}$. In the experiments described below, $CaCl_2$ was used in excess as it can be easily removed. Typical concentration of $CaCl_2$ can range from 0.5 wt % to as high as 5 wt %.

The hydrogel beads can be subsequently purified using methods known in the art. For example, washing with deionized water is a suitable way to remove the unbound calcium ions.

The hydrogel beads produced are initially in the water swollen state however these can be subsequently dried by freeze drying or oven drying. The dried beads can also be used for adsorbing pollutants.

The hydrogel beads for use herein as essentially insoluble in water or an aqueous composition containing at least one contaminant to be removed.

In one embodiment, there is also provided alginate beads in a substantially dry form. The alginate beads can be obtained after drying of hydrogel beads prepared in accordance with a process defined herein. The alginate beads in a substantially dry form comprise CNC, wherein said CNCs are incorporated partially or wholly within said beads by ionic crosslinking of adjacent alginate chains.

The concentration of alginate in the hydrogel beads can range between about 0.5 to about 3 wt %, preferably about 0.5 wt % and concentration of CNCs in the hydrogel beads can be from about 0.1 to about 6 wt %, preferably about 1 wt %. The inventors have prepared CNC-ALG hydrogel beads having 2 wt % alginate content and varying content of CNCs (e.g. from 0 to 1 wt %) and observed that with increasing CNC content, the adsorption capacity of the bead increased. It was also observed that by reducing the alginate content (e.g. from 2 wt % to 0.5 wt %), higher surface area of CNCs was available for adsorption, thus the overall adsorption increased. One preferred concentration is CNC-ALG hydrogel beads containing 0.5 wt % alginate and 1 wt % CNC content which can be prepared by crosslinking a solution formed by mixing 1 wt % alginate solution and 2 wt % CNC solution.

The range of CNC "loading" in the alginate beads can be varied. For example, about 0.1 wt % to about 2 wt % of CNCs can be incorporated into the hydrogel beads.

As used herein, the term "alginate salt" is known to the skilled person, and generally refers to any suitable alginate salt. The term alginate may also include alginic acid, as such, "alginate" may refer to an alginate salt, alginic acid or both.

The term "incorporated" as used herein, mean the confinement of one or more individual CNCs particles within a matrix material, such as within alginate beads. The CNC may be partially or wholly contained within the matrix material (in particular the beads). The CNCs particles are held to or within the matrix by any mechanical, chemical, or other force (e.g. ionic, van der Walls) or bond.

Non-limiting examples of contaminants that may be removed from water include dyes, (especially cationic dyes). Non-limiting examples of cationic dyes include Methylene blue, Methyl violet, Crystal violet, Rhodamine B, Ethyl violet, Bismark brown, Crysodine Y, Auromine O etc. Contaminants that may also be removed from water include heavy metal ions such as $Cu^{2+}$, $Zn^{2+}$, Cr (III), Cr (IV) Cr (VI), $Pb^{2+}$, $Hg^{2+}$, $Ni^{2+}$, As (III), As (V), $Mn^{2+}$, either alone or in combination. Contaminants further include naphthenic acids (e.g. from oil sands) and various other organic and inorganic contaminants in water.

In one embodiment, the hydrogel beads as defined herein can be used in a process for adsorbing contaminants, in water/aqueous mixtures. The process may be conducted in a water treatment process/application, including portable and/or large scale water treatment applications. The use can be in a batch process, as well as continuous process.

For use in a process or method described herein, the hydrogel beads may be included in housing or contained in a container suitable for holding fluids. The beads in said housing may therefore be exposed to a continuous feed stream or a batch of water or an aqueous composition containing at least one contaminant.

After the alginate beads have been exposed to feed streams or batches, it may be desirable to regenerate the beads (e.g. by removing all or part of the contaminant). In one embodiment, a regenerative solution may be contacted with <<contaminated>> alginate beads. In a batch system, amounts of regenerative solution may be successively used. In a continuous system, a simultaneous continuous flow of regenerative solution through the column may be used.

The pristine CNCs can be prepared by sulfuric acid hydrolysis. CNC can be extracted from any cellulose containing biomass and in this case we used Kraft bleached pulp. In the examples herein, CNCs were obtained from Celluforce Inc. (Windsor, Quebec Canada).

The adsorption and/or selectivity properties of hydrogel beads as defined herein for various contaminants can be modulated/improved using surface functionalized CNCs in place of pristine CNCs. Various strategies such as carboxyl functionalization, amine functionalization, polymer grafting and coating can be employed to surface functionalize CNCs. Also, the surface of pristine and surface functionalized CNCs can also be used to prepare CNCs on which active agents are bound. Non limiting examples include antibacterial agents, like silver nanoparticles for treating bacteria contaminating water, beta cyclodextrin for selective inclusion of pharmaceutical pollutants.

Grafting polymers like poly (methacrylic acid) bearing dense and active carboxyl groups onto CNCs is another approach to introduce more negatively charged carboxyl groups. Introduction of this polymer onto CNCs can greatly improve the adsorption of positively charged contaminants. CNCs can be grafted with poly(methacrylic acid), poly (acrylic acid) and other types of poly acids by radical polymerization approach using their respective monomers and ammonium persulfate as initiator in a controlled environment. It is also possible to use acrylate/methacrylate monomers in place or together with acrylic/methacrylic acid monomers.

Coating of CNCs with polymers like polydopamine is another way by which its adsorption and selectivity properties can be enhanced. Polydopamine is obtained from the self-polymerization of dopamine, which is a mussel inspired protein. The catechol and amine groups of dopamine make them an effective adsorbent for organic and inorganic chemicals. Polydopamine can be coated on CNCs by spontaneous oxidation of dopamine in an alkaline aqueous solution.

CNCs can be surface functionalized with additional negatively charged carboxyl groups by oxidizing them with TEMPO (2,2,6,6-Tetramethyl-1-piperidinyloxy) reagent. These carboxyl functionalized CNCs can be used for modulated/enhanced adsorption of positively charged contaminants. TEMPO oxidization of the primary alcohol moieties of CNC can be performed by adapting the procedure similar to Habibi et al., (See Habibi, Y.; Chanzy, H.; Vignon, M. R. TEMPO-mediated surface oxidation of cellulose whiskers. Cellulose 2006, 13, 679-687). Other oxidizing agents such as sodium or potassium dichromate (VI) acidified with dilute sulphuric acid or ammonium persulfate can also be used for the oxidation of alcohols to carboxylic acids. However, TEMPO catalyst is the most commonly used reagent for selectively oxidizing the primary hydroxyl groups of CNCs into carboxyl groups so far.

Degree of oxidation (DO) can be calculated using the data obtained from potentiometric titration based on methods reported in the literature (Perez, D. d. S.; et al. Biomacromolecules 2003, 4, 1417-1425).

The degree of oxidation (DO) was calculated based on the equation below:

$$DO = \frac{162(V_2 - V_1)c}{w - 36(V_2 - V_1)c}$$

where $V_1$ and $V_2$ are the amount of consumed NaOH (in L) in the titration, c is the concentration of NaOH (mol/L), w is the weight of the sample.

Functionalizing of CNCs with amine groups can be done by various methods as described in previous literatures (Dong, S., et al. Journal of the American Chemical Society 2007, 129(45), 13810-1) (Hemraz, U. D., et al. Canadian Journal of Chemistry 2013, 91(10), 974-981). For example, amine functionalized CNCs can be prepared by grafting 2-hydroxy-3-chloro propylamine (HCPA) to CNCs using etherification reaction in an organic solution based reaction media.

The degree of surface substitution (DS) of amine groups was determined by the nitrogen content evaluated by elemental analysis based on methods reported in literature (Filpponen, I., et al. Nanomaterials and Nanotechnology 2011, 1(1), 34-43; Filpponen, I., et al. Biomacromolecules 2010, 11(4), 1060-1066).

The degree of substitution was calculated based on the equation below:

$$DS = \frac{162 \times \% N}{1400 - 163.6 \times \% N}$$

The % N found out using elemental analysis is around 2.5 and hence by substituting this value in the above equation, degree of substitution was calculated to be 0.34.

Langmuir adsorption isotherm was used to calculate the maximum adsorption capacity $q_m$ of these pristine and surface functionalized CNCs incorporated alginate hydrogels. The value of $q_m$ was extracted using linearized form of Langmuir adsorption isotherm as shown below:

$$\frac{1}{q_e} = \frac{1}{K_L q_m C_e} + \frac{1}{q_m}$$

where $q_e$ is the amount of adsorbate adsorbed per g of adsorbent (mg/g) in equilibrium, $q_m$ is the maximum amount of adsorbate which can be adsorbed per g of adsorbent (mg/g) in equilibrium, $C_e$ is the equilibrium concentration of free adsorbate molecules in the solution (mg/L), $K_L$ is a constant related to the energy of adsorption (L/mg) which shows the affinity between the adsorbate and adsorbent. The linearized form of Langmuir adsorption isotherm can be represented as a plot of $1/q_e$ vs. $1/C_e$, where $q_m$ and $K_L$ can be found from the intercept and slope, respectively.

From Langmuir plot, $q_m$ for pristine CNCs incorporated alginate hydrogel beads for methylene blue in a batch adsorption process is found to be 256.4 mg/g. Adsorption study of methylene blue done using a fixed bed adsorption column found that the $q_m$ is 255.3 mg/g which is nearly equal to the $q_m$ obtained from the batch adsorption study. Batch adsorption study of methylene blue onto PD-CNCs incorporated alginate hydrogel beads gave a $q_m$ of 333.3 mg/g which illustrates that the adsorption property can be improved by surface functionalizing CNCs. PD-CNCs incorporated alginate hydrogel beads are also found to adsorb heavy metal ions like copper with a $q_m$ of 73 mg/g.

The inherent ionic charge and functional groups on the adsorbent can be tailored to selectively adsorb various contaminants in water. This is demonstrated using a selective adsorption of eschenmoser group containing cationic dye methylene blue from dye mixtures using PD-CNC incorporated alginate hydrogel beads. The UV-Vis spectra clearly show that the absorption peak of methylene blue completely disappeared in the two residual solutions, indicating all methylene blue are removed. PD-CNC incorporated alginate hydrogel beads has a separation efficiency of 100% whereas pristine CNCs incorporated alginate hydrogel beads had a separation efficiency of only adsorb 72% after 24 hours.

The hydrogel beads as defined herein can adsorb contaminants through various mechanisms based on the nature of the contaminants. Unlike conventional adsorbents (e.g. activated carbon), the proposed CNC incorporated hydrogel beads can be tailored to capture contaminants via electrostatic attraction between counter-ions. This driving force will partition the pollutants within the pores of the adsorbent, increasing the overall removal rate. Surface functionalizing of CNCs can be done to exploit the potential of other binding interactions as well, depending on the type of functionalization introduced to capture the contaminants.

It is believed that the pristine CNCs and surface functionalized CNCs as described herein could provide one or more advantages including: (i) the pristine CNCs have high surface area that can provide large number of active sites for the adsorption of contaminants in water; (ii) the negative charges on the surface of pristine CNCs due to sulfate ester groups can aid in binding to the positively charged contaminants in water; (iii) activation of CNCs by TEMPO oxidation can introduce more negatively charged carboxyl groups that can aid in binding to greater number of positively charged contaminants in water; (iv) CNCs can be surface functionalized with positively charged amine groups to aid in binding to negatively charged contaminants in water; (v) grafting polymers containing dense and active carboxyl groups can aid in improved adsorption of positively charged contaminants in water; (vi) polydopamine coating onto CNCs can introduce catechol and amine groups which can aid in the adsorption of organic and inorganic chemicals, heavy metal ions etc; (vii) the catechol groups provided by the polydopamine coating can be exploited for the selective dye adsorption of eschenmoser group containing dyes like methylene blue; and (viii) antibacterial agents like silver nanoparticles can also be deposited on this polydopamine coating so as to treat bacteria contaminated water.

Example 1—Preparation of CNCs Incorporated Alginate Hydrogel Beads

Pristine and surface functionalized CNCs incorporated alginate hydrogel beads can be prepared by simple ionotropic gelation method. Sodium alginate forms stable hydrogels when it is crosslinked with di/trivalent cations such as $Ba^{2+}$, $Ca^{2+}$ and $Fe^{3+}$.

2 wt % of pristine or surface functionalized CNCs solution was mixed with 1 weight % of sodium alginate solution with the help of a homogenizer. Then this solution mixture was drawn into syringes and placed in an injection pump. This solution was then injected at a flow rate of 5 ml/min into a gellant bath containing 50 ml of 2 wt % calcium chloride ($CaCl_2$) solution. A slight stirring was given to the gellant bath to prevent the beads from sticking to each other. The beads were then allowed to crosslink in $CaCl_2$ solution for 15 minutes after which it was washed with water to remove residual $CaCl_2$. These hydrogel beads can be directly used for batch as well continuous adsorption process.

Example 2—Carboxyl Functionalization of CNCs

The primary hydroxyl groups on the surface of the CNCs were oxidized into carboxyl groups using NaClO and NaBr assisted by 2,2,6,6,-tetramethyl-1-(pyperidinyloxy) radical (TEMPO). TEMPO is a stable and water-soluble nitroxyl radical. It can only oxidize the primary hydroxyl groups on CNCs to convert them to carboxylic acids due to its steric hindrance (Saito, T. et al. Biomacromolecules 2004, 5, 1983-1989) (Habibi, Y.; et al. Cellulose 2006, 13, 679-687).

In order to disrupt the CNC bundles and obtain a homogenous dispersion, CNCs (2 g) were dispersed in deionized water (400 ml). After vigorous mixing, sonication was applied for 15-20 minutes using Branson™ 1510 sonicator (Branson Ultrasonic Corporation, USA) for 15-20 minutes to obtain a homogeneous dispersion of CNCs. Then, TEMPO (59 mg, 0.376 mmol) and NaBr (650 mg, 6.3 mmol) were added to the CNCs suspension and stirred for 30 min at room temperature until the entire TEMPO reagent was dissolved. The pH of the solution was adjusted to 10 using 0.5 M NaOH solution. The oxidation was initiated by slowly adding 15% NaOCl solution (14.2 ml) to the CNCs suspension over a period of 30 minutes under gentle agitation. The pH was kept constant at 10, by the continuous addition of 0.1/0.5 M NaOH. The reaction was known to be complete after 4 hours when no additional reduction in the pH was observed. Then, the solution was continuously stirred overnight and finally excess oxidant was quenched using methanol (22 ml) and the pH of the solution was adjusted to 7 using 0.1/1.0 M HCl. In order to purify the oxidized nanocrystals, the solution was dialyzed against distilled water for 1 week using cellulose dialysis membrane (Spectator™, MWCO: 12000-14000 Da) (Araki, J. et al. Cellulose, (2001) (17), pp 21-27). The solution became clear after 1 h of performing the TEMPO mediated oxidation of CNCs to carboxylated CNCs with the structure of β-1,4-linked polyglucuronic acid sodium salt. The packing of cellulose molecules into crystalline unit cell is such that only half of the primary hydroxyl groups (hydroxymethyl) are extended from the crystalline structure. These hydroxyl groups are only then accessible for oxidation because CNCs form aggregates due to defects such as twists, kinks and chain ends. Regio-selective oxidation of hydroxyl groups on the surface of CNCs to carboxylic acid occurs because half of the cellulose chains on the surface are buried inside the crystalline domains of the nanocrystals whereas the other half on the exterior of the aggregates are only available for oxidation. The 1-oxopiperidinium ions on the surface of CNCs are accessible for oxidation. The conversion of primary hydroxyl groups to carboxylic acids is known to be pH dependent and pH of the reaction medium also affects oxidation time. The shortest oxidation time is observed at a pH of 10. The secondary hydroxyl groups may be oxidized at acidic pH values, whereas, at pH values higher than 10, the cellulose could be degraded by β-elimination that decreases the molecular weight of the resulting cellulose fibres.

Example 3—Amine Functionalization of CNCs

Amine functional groups were introduced on the surface of CNCs using a one-pot synthesis method adapted from the method reported previously in the literature (Dong, S., et al Journal of the American Chemical Society, 129(45), 13810-1).

The synthesis was carried out in 2 different steps. In the first step, epichlorohydrin (1.46 ml) was added to ammonium hydroxide (3.78 ml). The mixture was then heated to 65° C. for 2 hours. [Caution: This reaction is highly explosive and must be done under reflux condition.] In the second step, CNCs (1 g) were dispersed in DMSO (66.66 ml) in a round bottom flask and TBAH (1.48 g) was added to it. Contents from the step 1 reaction was drawn into a syringe and added drop-wise to the second mixture. The reaction mixture was then stirred for 3.5 hours and heated at 65° C. This final reaction mixture containing the amine group functionalized CNCs was purified by dialysis against deionized water using cellulose dialysis membrane (Spectator™, MWCO: 12000-14000 Da) to remove unreacted chemicals and free polymers. The dialysis was carried out for at least a week until the conductivity of the dialysis medium remains constant. Further purification was done by repeated cycles of pH assisted aggregation of CNCs and centrifugation. Different reaction parameters, such as time, temperature, and reactants molar ratio could be changed resulting in the variations of number of amine groups on the surface of CNCs.

Example 4—Poly(Methacrylic Acid) Ciraftinci on CNCs

Poly(methacrylic acid) can be grafted onto CNCs by radical polymerization. 0.6 g of CNCs was dissolved in 60 ml of distilled water taken in a 250 ml four-necked flask equipped with a mechanical stirrer, a thermometer, a reflux condenser. The solution was then purged with $N_2$ for 30 min to remove oxygen. 100 mg of initiator ammonium persulfate was charged to the flask under continuous stirring and kept at 60 C for 10 min. After 10 minutes the reaction mixture was cooled to 50° C., after which 600 mg of degassed methacrylic acid monomer solution and 580 mg sodium bicarbonate dissolved in 5 ml water were added. The temperature was slowly raised to 70° C., and maintained for 3 hour to complete polymerization. Unreacted chemicals and free polymers formed during the reaction can be removed by dialysing against millipore water using a 12,000 Da MWCO dialysis membrane for 2-3 days.

Example 5—Polydopamine Coating on CNCs

Polydopamine can be coated virtually on any substrates by spontaneous oxidation of dopamine in alkaline aqueous solution. (Lee, M., et al ChemPlusChem 2012, 77(11), 987-990).

0.5 g of CNC was dispersed well in 100 ml of water using a homogenizer for 15 minutes. 0.3 g of Tris(hydroxymethyl) amino methane was added to the CNC solution after which 0.5 g Dopamine hydrochloride was added. The solution was then stirred for 3 hours at 370 rpm and 60° C. for dopamine to self-polymerize and coat onto CNC. The resulting polydopamine coated CNCs solution was then filtered by ultrafiltration under 40 psi using nitrogen gas, while being stirred at 400 rpm.

Example 6—Dye Adsorption Studies

First the stock solutions of Methylene Blue (MB) and adsorbents (CNC or surface functionalized CNCs incorporated alginate hydrogel beads) were prepared.

Batch adsorption studies: For each batch adsorption study, hydrogel beads were mixed well with dye solution of particular concentration taken in 200 ml plastic bottle with the help of a magnetic stirrer set at 500 rpm for 1 hour. The experiments were conducted at the neutral pH and 25° C. After mixing for 1 hour, concentration of free dye molecules in the supernatant is determined using UV-Vis spectrophotometer. The calibration curve prepared by plotting the absorbance values of known concentration of MB at 664 nm was used to convert the absorption values of free dye molecules to its corresponding concentration values. The amount of dye adsorbed $q_e$ on the surface of CNC was calculated using the following equation:

$$q_e = \frac{(C_0 - C_e)V}{m}$$

where $q_e$ is the amount of dye adsorbed for 1 g of adsorbent (mg/g), $C_e$ is the equilibrium concentration of free dye molecules in the solution (mg/L), $C_0$ is the initial dye concentration (mg/L), V is the volume of solution (L) and m is the mass of adsorbent (g). Maximum adsorption capacity of the hydrogel beads is found by fitting the data using Langmuir adsorption isotherm.

The results of PD-CNC-ALG hydrogel beads were obtained from batch experiments whereas the results of CNC-ALG hydrogel beads were obtained using both batch and fixed bed adsorption experiments. Remaining results were all extracted from literatures.

Comparing the adsorption performance of CNCs based adsorbents with non-conventional adsorbents and activated carbons revealed that adsorbents in accordance with this disclosure are better than certain traditional adsorbents (e.g. rice husk, fly ash etc), and are comparable to activated carbon.

TABLE 1

| Material | $q_m$ (mg/g) | References |
| --- | --- | --- |
| Rice Husk | 40.6 | 1. |
| Hazelnut Shell | 38.2 | 2. |
| Banana Peel | 20.8 | 3. |
| Kaolin | 20.5 | 4. |
| Orange Peel | 18.6 | 3. |
| Fly Ash | 12.7 | 5. |
| CNC | 118 | 6. |
| CNC-OX | 769 | 6. |
| CNC-ALG | 255.3 | Present disclosure |
| PD-CNC-ALG | 370.4 | Present disclosure |
| Saw Dust | 294 | 7. |
| Rice Husk | 343 | 8. |
| Bamboo Dust | 143 | 8. |
| Commercial AC | 980 | 8. |

The following references are incorporated herein by reference in their entirety: 1. Vadivelan, V., et al. Journal of Colloid and Interface Science 2005, 286(1), 90-100. 2. Dogan, M., et al. Water, air, and soil pollution 2008, 192(1-4), 141-153. 3. Annadurai, G., et al. Journal of hazardous materials 2002, 92(3), 263-274. 4. Ghosh, D., et al. Applied Clay Science 2002, 20(6), 295-300. 5. Wang, S., et al. Fuel 2008, 87(15), 3469-3473. 6. Batmaz, R., et al. Cellulose 2014, 21, 1655-1665 7. Hameed, B. H., et al. Dyes and Pigments 2007, 75(1), 143-149 8. Kannan, N., et al. Dyes and pigments 2001, 51(1), 25-40.

Figure 2:
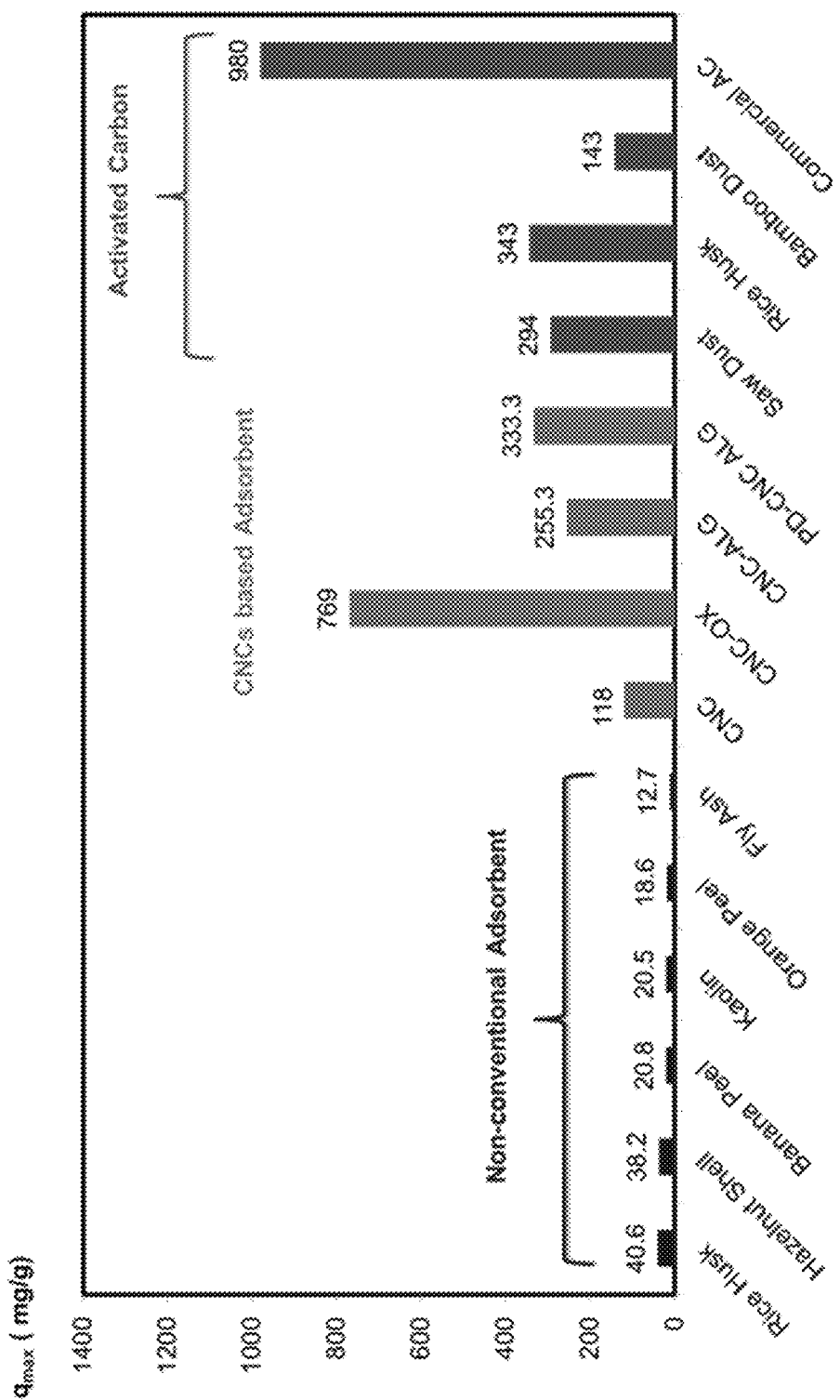
FIG. 2 is the comparison of adsorption performance of CNCs based adsorbents with non-conventional adsorbents and activated carbons.
Figure 3:
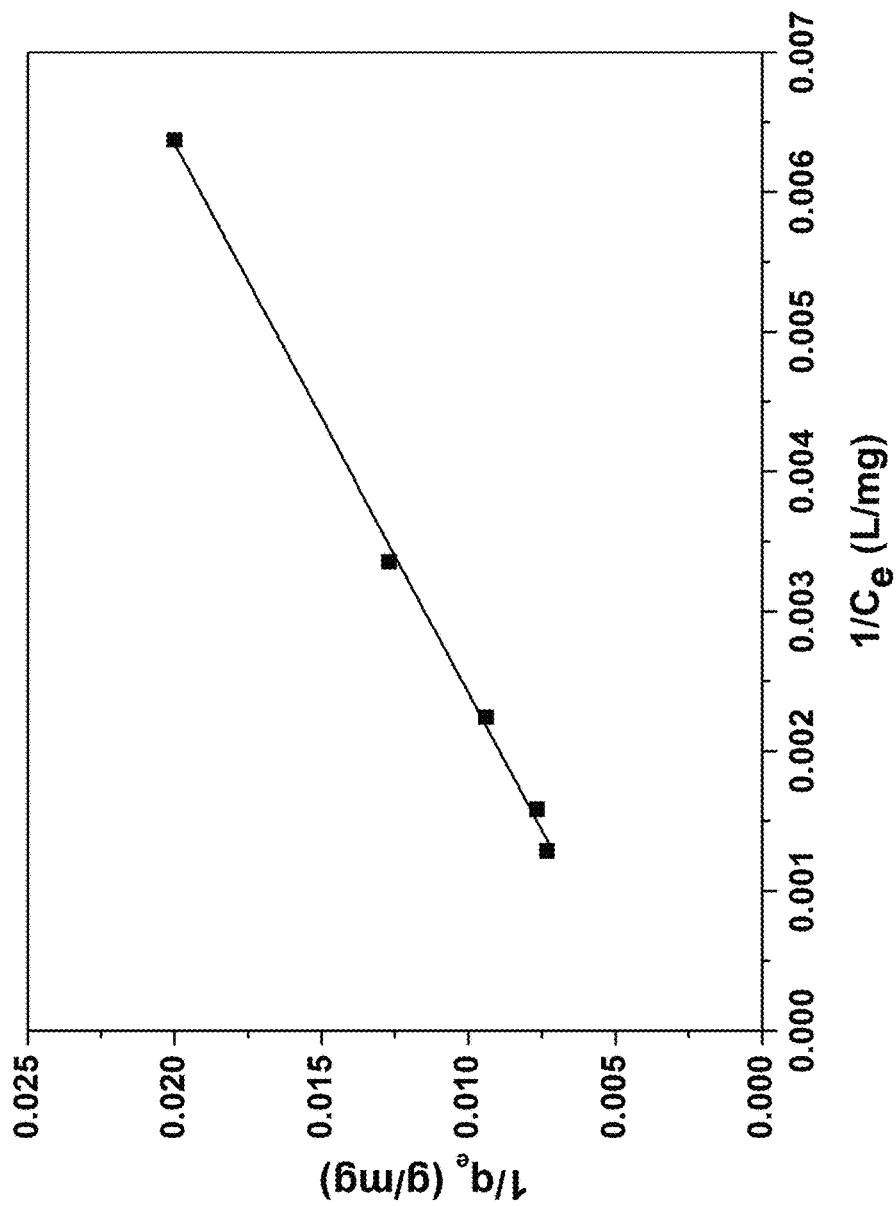
FIG. 3 is the Langmuir adsorption isotherm of a model cationic dye methylene blue onto hydrogel beads as defined herein in a batch adsorption process.
Figure 4:
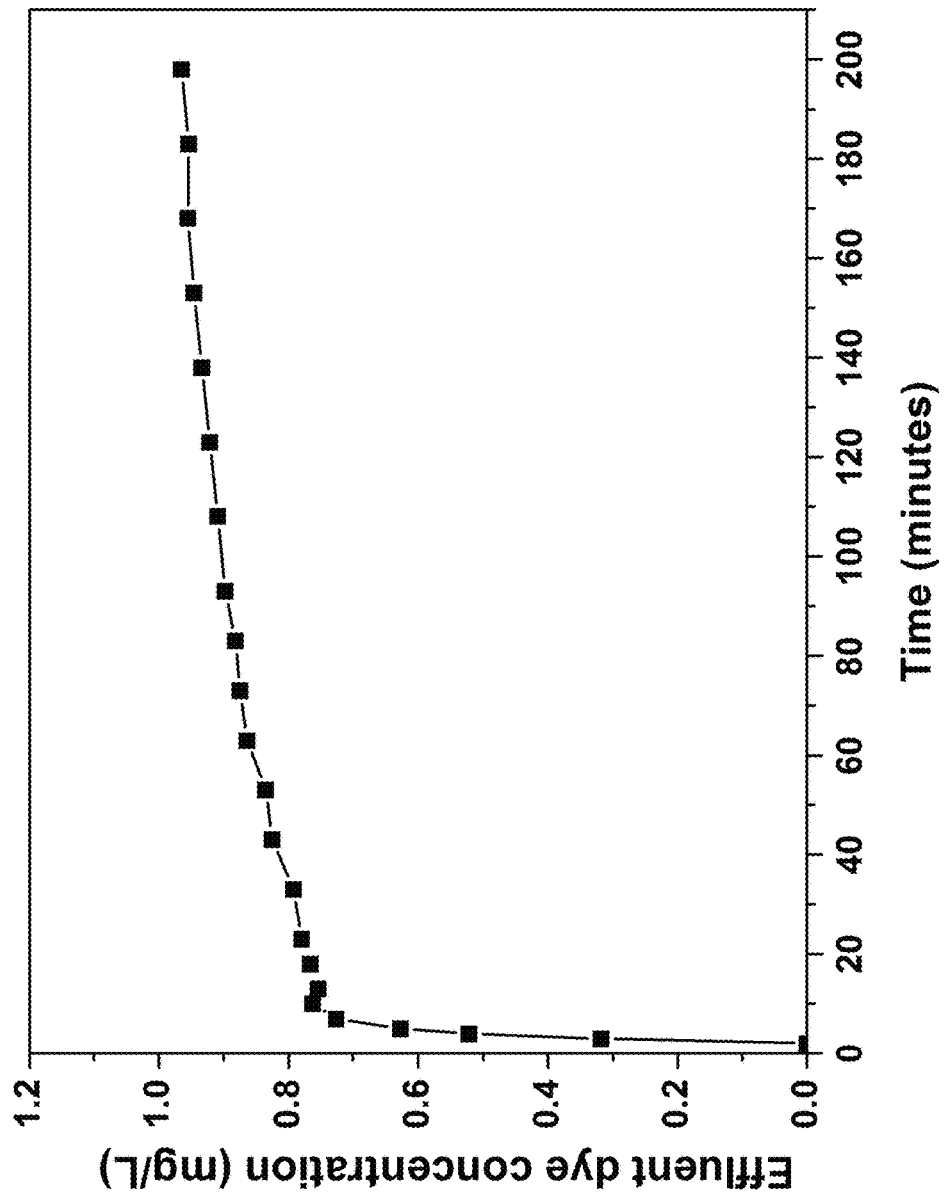
FIG. 4 is the break through curve for adsorption of a model cationic dye methylene blue onto hydrogel beads as defined herein in a continuous column adsorption process.
Figure 5:
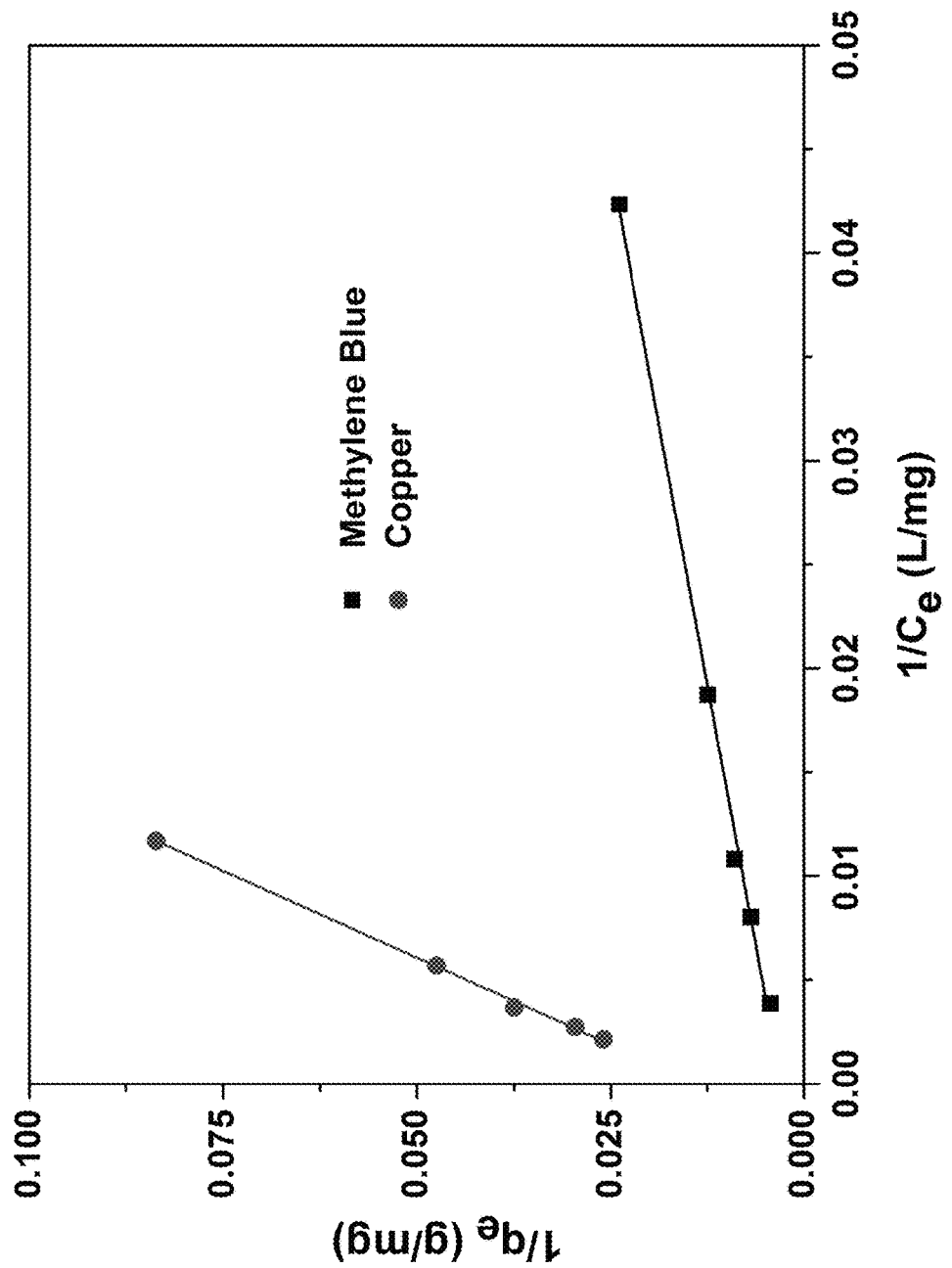
FIG. 5 is the Langmuir adsorption isotherm of methylene blue and copper onto hydrogel beads as defined herein in a batch adsorption process.

In FIG. 2 and table 1, "CNC" refers to pristine CNCs, "CNC-OX" refers to carboxyl functionalized CNCs, "CNC-ALG" refers to pristine CNCs incorporated alginate hydrogel beads, "PD-CNC-ALG" refers to polydopamine coated CNCs incorporated alginate hydrogel beads and AC means activated carbon.

Figure 6A:
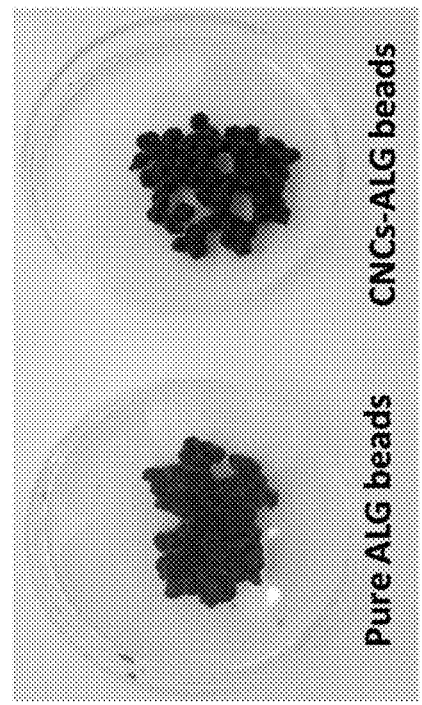
FIGS. 6A and 6B represents a comparison in dye adsorption properties of pure alginate beads compared to hydrogel beads incorporating cellulose nanocrystals and photograph illustrating same.
Figure 6B:
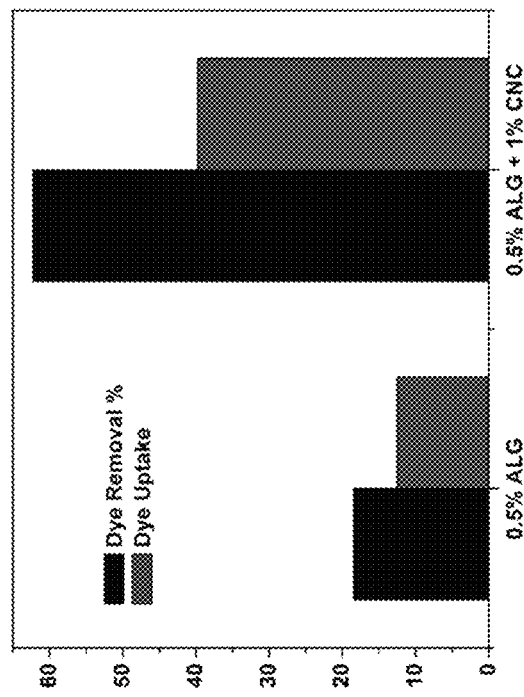

A comparative dye adsorption study between alginate hydrogel beads with and without CNCs was also conducted. FIGS. 6A and 6B shows the improvement in dye adsorption characteristics of 0.5 wt % ALG+1 wt % CNCs beads compared to pure 0.5 wt % ALG beads. A 3 times improvement in the adsorption ability was observed as seen from the dye removal and dye uptake results.

Fixed bed column adsorption studies: For fixed bed column adsorption experiment, the 250 mg/L concentration dye solution is passed through a column filled with 80% hydrogel beads at a flow rate of 4.4 ml/min. The column is made with a acrylic tubing of ½" outer diameter and ⅜" inner diameter and possesses a volume of 23.5 ml. Outlet dye samples are collected at regular time intervals and the concentration of the dye in the effluent is determined using UV-Vis spectrophotometer. To find out the maximum adsorption capacity of the beads, the beads are saturated by continuously passing dye through the column till the concentration of dye at the inlet equals that of outlet. Maximum adsorption capacity of the beads can be found out by performing the mass balance on the amount of dye adsorbed on complete saturation of the hydrogel beads. The maximum adsorption capacity of the CNC-ALG hydrogel beads calculated from this experiment is 255.3 mg/g which corroborates with the maximum adsorption capacity determined from batch adsorption studies.

Figure 7A:
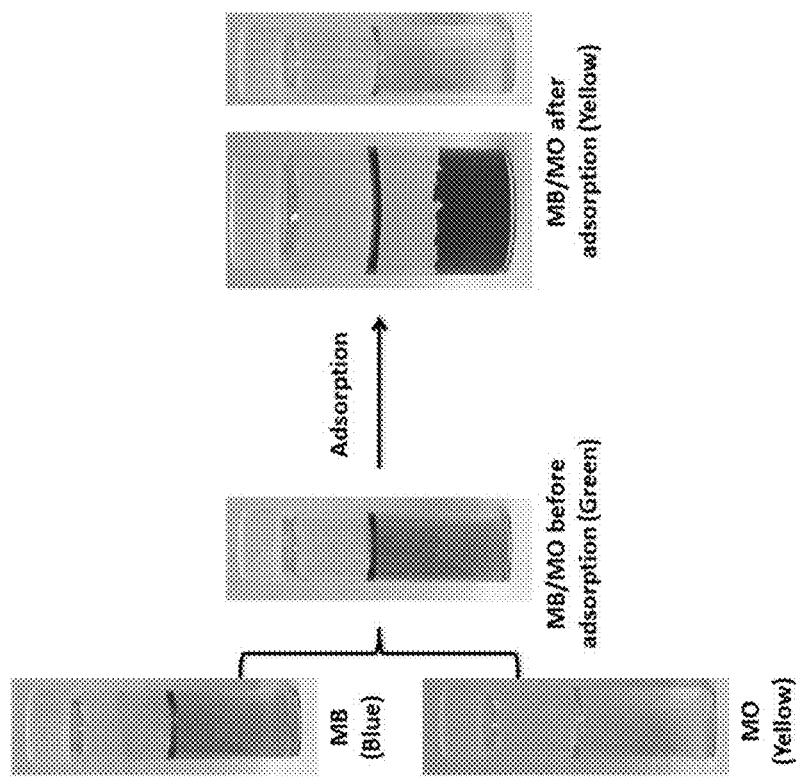
FIGS. 7A, 7B and 8 are demonstrating the selective dye adsorption properties of alginate hydrogel beads as defined herein.
Figure 7B:
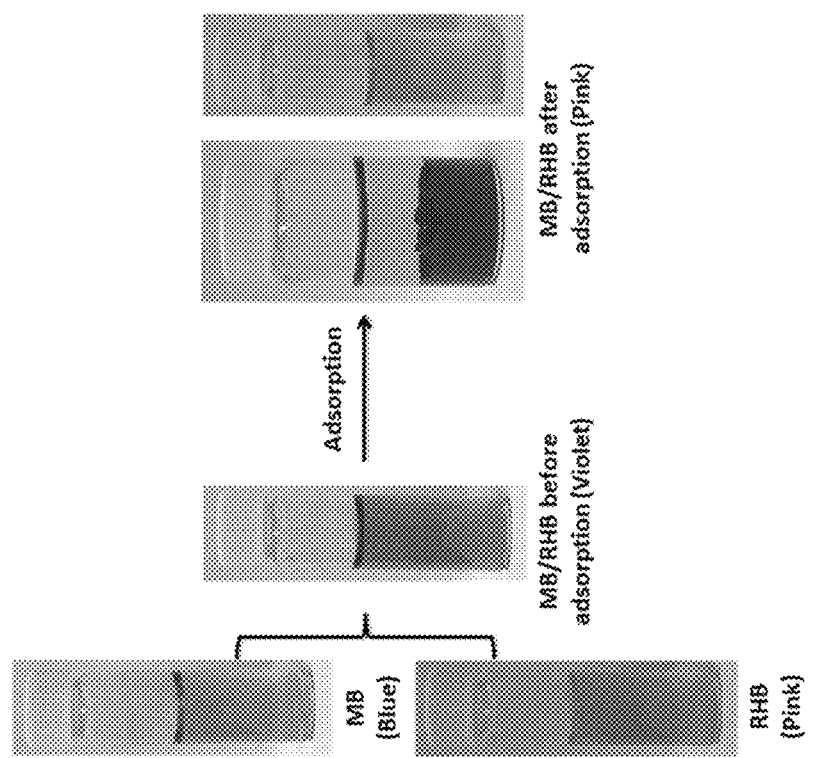
Figure 8:
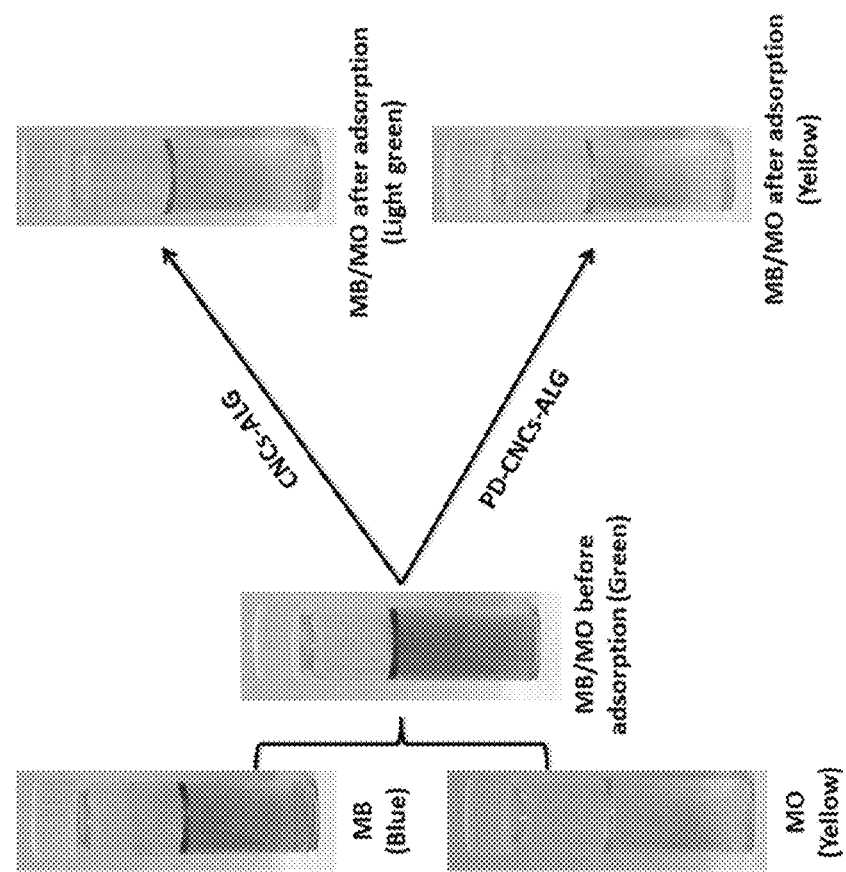

Selective Dye Adsorption Studies:

Selective adsorption property of hydrogel beads are studied by stirring the beads in two mixed solutions containing MB/MO and MB/RHB (MB—Methylene Blue, MO—Methyl Orange, RHB—Rhodamine B) in 1:1 molar ratio respectively for 24 hours. The mixed solution and residual solution are examined by UV-Vis absorption. The separation efficiency (R) is calculated using the formula:

$$R = \left[1 - \frac{C_m}{C_0}\right] \times 100$$

where $C_m$ and $C_0$ are the MB concentrations in the original MB/MO or MB/RHB mixed solution and in the solution after adsorption, respectively. Because of the selective adsorption ability of PD-CNC-ALG hydrogel beads, MB was completely removed from mixed solutions formed by the combination of MB (blue colour) with MO (yellow colour) and RHB (pink colour). This is evident from the green colour mixtures formed by mixing MB with MO turning back to orange colour, while the violet solution mixture formed by mixing MB with RHB became pink due to the complete removal of MB by PD-CNC. The improved selective adsorption capacity of the hydrogels upon polydopamine functionalization of CNCs was demonstrated by comparing the selective adsorption capability of CNC-ALG and PD-CNC-ALG hydrogel beads when stirred in a green solution mixture prepared by mixing MB (blue colour) and MO (yellow colour). The green solution mixture after adsorption using CNC-ALG hydrogel beads became light green in colour due to the presence of MB whereas the PD-CNC-ALG hydrogel beads turned to yellow due to the complete removal of MB. (See FIGS. 7A, 7B and 8).

Example 7—Deposition of Silver and Evaluation of Antibacterial Activity

The polydopamine coated CNCs prepared according to the procedure mentioned in example 5 are used for deposition of silver. These silver deposited PD-CNC were incorporated into alginate hydrogel beads and are evaluated of their antibacterial activity against gram negative bacteria *Escherichia coli* and gram positive bacteria *Bacillus subtilis*.

Deposition of Silver:

Silver nanoparticles can also be deposited on polydopamine coated CNCs (PD-CNCs) to make them antibacterial. 3 wt % of $NH_4OH$ is added drop by drop to 20 ml of 0.25 wt % $AgNO_3$ solution under slight stirring until a clear solution is observed. 0.5 ml of 3 wt % PD-CNCs is added to this clear solution and stirred at room temperature for 30 minutes. Subsequently, 1 ml of 0.4 wt % of dopamine hydrochloride is added to the solution and stirred for an additional 2 hours. The resulting solution was centrifuged to obtain silver coated PD-CNCs. These silver deposited PD-CNC are incorporated into alginate hydrogel beads.

Evaluation of Antibacterial Activity:

Varying dosage of Ag-PD-CNC-ALG hydrogel beads (10 mg, 20 mg and 30 mg) were added to a solution consisting of 10 mL of OptiGrow™ Pre-Weighted LB Broth containing 100 μL of *Escherichia coli* inoculate. The mixture was incubated at 37° C. and shaken at 250 RPM. A control without any beads was also setup for comparing CFU counts. A similar experiment was setup using *Bacillus subtilis* to evaluate the performance of the system with Gram-positive bacteria. With increase in Ag-PD-CNC-ALG hydrogel beads dosage it was observed an improvement in antibacterial activity for both *Escherichia coli* and *Bacillus subtilis*. At 2 mg/ml no growth of both bacteria was observed (the conclusion was based on the visual inspection of petri dish. No bacterial colonies were seen in petri dish).

These experiments suggest the hydrogel beads can be made antibacterial by functionalizing the CNCs with antibacterial agents like silver nanoparticles. The added advantage of this type of immobilization of antibacterial agents in hydrogel beads is that it can also prevent the release of these nanoparticles which is critical for use in potable drinking water treatment applications. This was further confirmed by studying the release of silver nanoparticles from the hydrogel beads by stirring them in water for 24 hours. The release of silver nanoparticles quantified using UV-Vis spectroscopy suggests that its released was less than 0.1 μg/L, which is considered safe according to WHO safe drinking water guidelines.

In FIGS. 9A to 9H, the concentrations such as "1 mg/mL" are based on the amounts of hydrogel beads stirred in the bacteria containing broth for evaluating the antibacterial activity. So for 1 mg/ml, 10 mg of hydrogel beads were stirred in 10 ml of broth.

While the disclosure has been described in connection with specific embodiments thereof, it is understood that it is capable of further modifications and that this application is intended to cover any variation, use, or adaptation of the disclosure following, in general, the principles of the disclosure and including such departures from the present disclosure that come within known, or customary practice within the art to which the disclosure pertains and as may be applied to the essential features hereinbefore set forth, and as follows in the scope of the appended claims.

The invention claimed is:

1. Hydrogel beads incorporating cellulose nanocrystals (CNC), wherein said CNCs are incorporated partially or wholly within said beads, said beads comprising a matrix of cross-linked natural or synthetic polymer and said CNC being pristine or functionalized CNCs; and wherein the cross-linked natural or synthetic polymer is a hydrogel-forming polymer comprising alginate, chitosan, starch, polylacrylic acid or polystyrene.

2. The hydrogel beads of claim 1 wherein the cross linkable cross-linked natural or synthetic polymer is alginate.

3. The hydrogel beads of claim 1 wherein the matrix of cross-linked natural or synthetic polymer is cross-linked by ionic crosslinking.

4. The hydrogel beads of claim 3 wherein the ionic crosslinking is an ionic crosslinking using di/trivalent cations.

5. The hydrogel beads of claim 1 wherein said beads are comprising from about 0.1 wt % to about 2 wt % of CNCs.

6. The hydrogel beads of claim 1 wherein said beads are comprising between about 0.5 to about 3 wt % of alginate and from about 0.1 to about 6 wt % of CNCs in the hydrogel beads.

7. The hydrogel beads of claim 1 wherein said CNC is pristine CNC.

8. Hydrogel beads incorporating cellulose nanocrystals (CNC), wherein said CNCs are incorporated partially or wholly within said beads, said beads comprising a matrix of cross-linked natural or synthetic polymer and said CNC being pristine or functionalized CNCs; wherein the cross-linked or synthetic polymer is a hydrogel-forming polymer;

and wherein said CNC is functionalized by carboxyl functionalization, amine functionalization, polymer grafting or amine coating.

9. A method of preparing hydrogel beads incorporating CNC, said method comprising:
   i) providing an aqueous mixture of a cross-linkable natural or synthetic polymer and pristine or functionalized CNCs, wherein the cross-linkable natural or synthetic polymer is comprising alginate, chitosan, starch, polylacrylic acid or polystyrene; and
   ii) contacting the mixture of step i) with a cross-linker suitable to cause the formation of hydrogel beads by cross-linking of adjacent chains of said cross-linkable natural or synthetic polymer.

10. A method of preparing hydrogel beads incorporating CNC, said method comprising:
    i) providing an aqueous mixture of a cross-linkable natural or synthetic polymer and pristine or functionalized CNCs; and
    ii) contacting the mixture of step i) with a cross-linker suitable to cause the formation of hydrogel beads by cross-linking of adjacent chains of said cross-linkable natural or synthetic polymer; wherein:
    said step i) is comprising:
       providing a first aqueous mixture of said cross-linkable natural or synthetic polymer and said pristine or functionalized CNCs; and
       providing a second aqueous mixture comprising a cross-linker for cross-linking adjacent chains of said cross-linkable natural or synthetic polymer; and
    said step ii) is comprising:
       contacting said first and second aqueous mixtures; and
       allowing the mixtures to react and form hydrogel beads incorporating CNCs.

11. The method of claim 9 wherein the cross-linkable natural or synthetic polymer is alginate.

12. The method of claim 9 wherein the matrix of cross-linked natural or synthetic polymer is cross-linked by ionic crosslinking.

13. The method of claim 12 wherein the ionic crosslinking is an ionic crosslinking using di/trivalent cations.

14. The method of claim 9 further comprising a step of purifying said hydrogel beads and/or drying of said hydrogel beads.

15. The method of claim 9 wherein the concentration of alginate in the aqueous mixture is ranging from between about 0.5 to about 3 wt % and concentration of CNCs in the aqueous mixture is from about 0.1 to about 6 wt %.

* * * * *